(12) United States Patent
Hickey et al.

(10) Patent No.: US 8,930,432 B2
(45) Date of Patent: Jan. 6, 2015

(54) FLOATING POINT EXECUTION UNIT WITH FIXED POINT FUNCTIONALITY

(75) Inventors: Mark J. Hickey, Rochester, MN (US);
Adam J. Muff, Rochester, MN (US);
Matthew R. Tubbs, Rochester, MN (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 13/197,894

(22) Filed: Aug. 4, 2011

(65) Prior Publication Data

US 2013/0036296 A1 Feb. 7, 2013

(51) Int. Cl.
*G06F 7/38* (2006.01)
*G06F 7/44* (2006.01)

(52) U.S. Cl.
USPC .......................................... 708/501; 708/503

(58) Field of Classification Search
CPC ........ G06F 7/483; G06F 7/487; G06F 7/4876
USPC ................................................... 708/501, 503
See application file for complete search history.

(56) References Cited

U.S. PATENT DOCUMENTS

| | | | | |
|---|---|---|---|---|
| 3,701,976 A * | 10/1972 | Shively | ......................... | 708/209 |
| 6,401,194 B1 * | 6/2002 | Nguyen et al. | ................ | 712/210 |
| 6,529,928 B1 * | 3/2003 | Resnick et al. | ................ | 708/505 |
| 8,667,042 B2 * | 3/2014 | Wiedemeier et al. | ......... | 708/501 |
| 2009/0083357 A1 * | 3/2009 | Muff et al. | .................... | 708/445 |

* cited by examiner

*Primary Examiner* — Chuong D Ngo
(74) *Attorney, Agent, or Firm* — Wood, Herron & Evans, LLP

(57) ABSTRACT

A floating point execution unit is capable of selectively repurposing one or more adders in an exponent path of the floating point execution unit to perform fixed point addition operations, thereby providing fixed point functionality in the floating point execution unit.

22 Claims, 6 Drawing Sheets

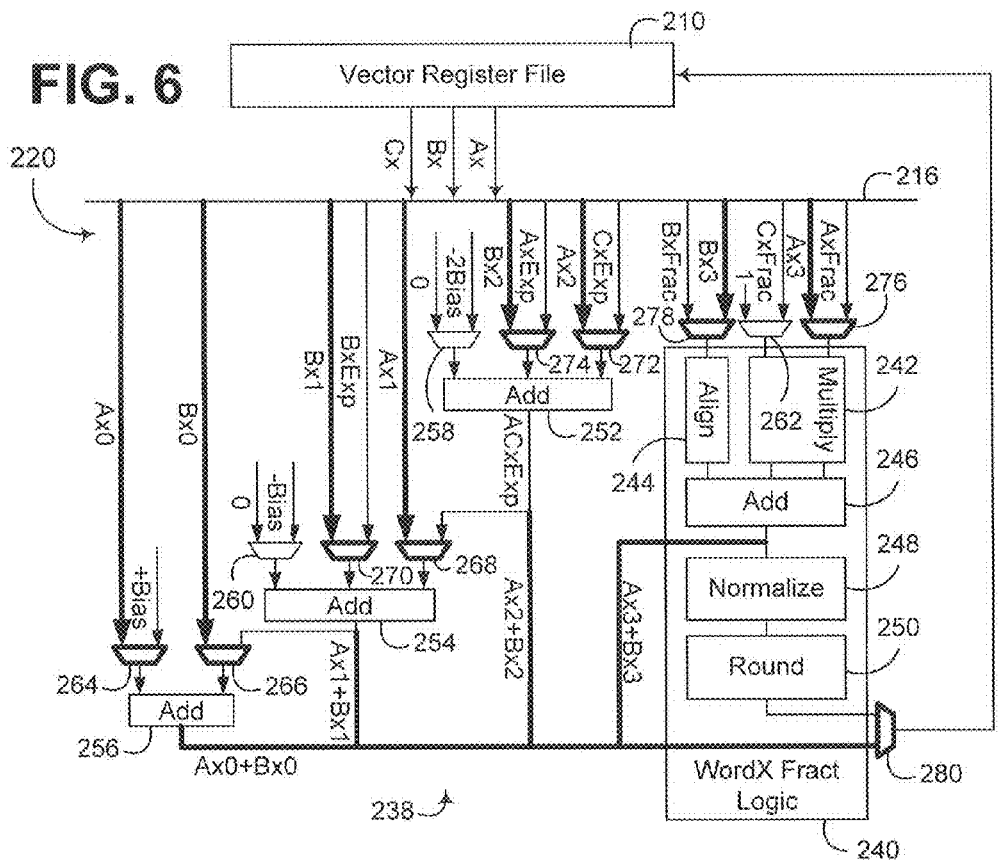
FIG. 6
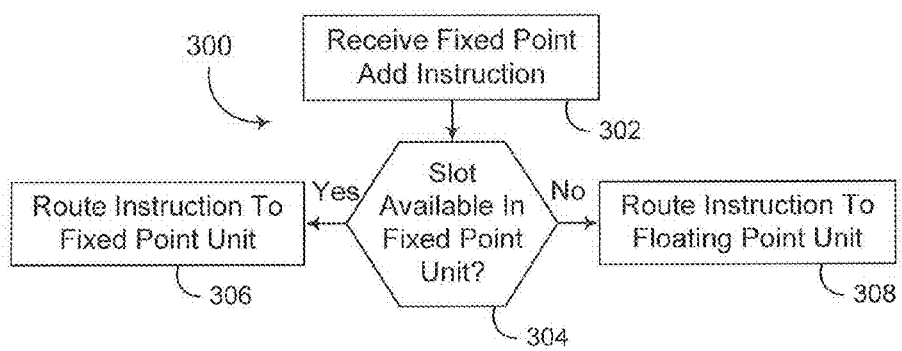
FIG. 7A
FIG. 7B
FIG. 8

US 8,930,432 B2

FLOATING POINT EXECUTION UNIT WITH FIXED POINT FUNCTIONALITY

FIELD OF THE INVENTION

The invention is generally related to data processing, and in particular to processor architectures and floating point execution units incorporated therein.

BACKGROUND OF THE INVENTION

Modern computer processor architectures typically rely on multiple functional units to execute instructions from a computer program. An instruction or issue unit typically retrieves instructions and dispatches, or issues, the instructions to one or more execution units to handle the instructions. A typical computer processor may include, for example, a load/store unit that handles retrieval and storage of data from and to a memory, and a fixed point execution unit, or arithmetic logic unit (ALU), to handle logical and arithmetic operations.

Whereas earlier processor architectures utilized a single ALU to handle all logical and arithmetic operations, demands for increased performance necessitated the development of superscalar architectures that utilize multiple execution units to handle different types of computations. Doing so enables multiple instructions to be routed to different execution units and executed in parallel, thereby increasing overall instruction throughput.

One of the most common types of operations that can be partitioned into a separate execution unit is floating point arithmetic. Floating point calculations involve performing mathematical computations using one or more floating point values. A floating point value is typically represented as a combination of an exponent and a significand. The significand, which may also be referred to as a fraction or mantissa, represents the digits in a floating point value with a predetermined precision, while the exponent represents the relative position of the binary point for the floating point value. A floating point execution unit typically includes separate exponent and significand paths, with a series of adders incorporated into the exponent path to calculate the exponent of a floating point result, and a combination of multiplier, alignment, normalization, rounding and adder circuitry incorporated into the significand path to calculate the significand of the floating point result.

Floating point execution units may be implemented as scalar execution units or vector execution units. Scalar execution units typically operate on scalar floating point values, while vector execution units operate on vectors comprising multiple scalar floating point values. Vector floating point execution units have become popular in many 3D graphics hardware designs because much of the data processed in 3D graphics processing is readily vectorizable (e.g., coordinates of objects in space are often represented using 3 or 4 floating point values).

When a separate floating point execution unit is utilized in a computer processor, other arithmetic and logical operations are typically handled in a smaller, less complex fixed point execution unit. Fixed point arithmetic, in contrast with floating point arithmetic, presumes a fixed binary point for each fixed point value. Arithmetic operations are typically performed more quickly and with less circuitry than required for floating point execution units, with the tradeoff being reduced numerical precision. Floating point operations can also be compiled into multiple fixed point operations capable of being executed by a fixed point execution unit; however, a floating point execution unit often performs the same operations much more quickly and using less instructions, so the incorporation of a floating point execution unit into a processor often improves performance for many types of computationally-intensive workloads.

Most high performance processors have therefore migrated to an architecture in which both fixed point and floating point execution units are incorporated into the same processor, thereby enabling a processor to optimally handle different types of workloads. For other types of computer processors such as mobile processors, embedded processors, low power processors, etc., however, the inclusion of both a fixed point execution unit and floating point execution unit may be problematic, often increasing cost and requiring excessive circuitry and power consumption. In such applications, designers may opt to forego a separate floating point execution unit and rely on compilation to convert floating point operations into fixed point operations that can be executed, albeit more slowly, on a fixed point execution unit.

Therefore, a need continues to exist for supporting both fixed point and floating point operations in a computer processor with reduced cost, circuitry, power consumption and adverse impacts on performance.

SUMMARY OF THE INVENTION

The invention addresses these and other problems associated with the prior art by providing a floating point execution unit that is capable of selectively performing fixed point addition operations by repurposing one or more adders in the exponent path of the floating point execution unit to perform fixed point adds.

Consistent with one aspect of the invention, a floating point execution unit is configured to process at least one floating point operand during execution of a first instruction. The floating point execution unit includes an exponent path and a significand path respectively configured to generate exponent and significand fields of a floating point value calculated during execution of the first instruction, and the exponent path includes an adder used when generating the exponent field of the floating point value. The floating point execution unit is further configured to process at least one fixed point operand during execution of a second instruction by using the adder in the exponent path to generate at least a portion of a fixed point value calculated during execution of the second instruction.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a block diagram of an exemplary processing lane in the vector floating point execution unit of FIG. 5.

FIGS. 7A and 7B are block diagrams of an exemplary register bit map suitable for implementing floating point and fixed point values in the register file referenced in FIG. 6.

FIG. 8 is a flowchart illustrating the program flow of a fixed point addition instruction routing routine capable of being implemented in a superscalar processing unit incorporating fixed point and floating point execution units.

DETAILED DESCRIPTION

Embodiments consistent with the invention utilize a floating point execution unit that selectively repurposes one or more adders normally used in the performance of floating point operations to perform fixed point addition operations. An instruction set may include one or more instructions that are routed to the floating point unit to initiate the performance of such fixed point addition operations.

It will be appreciated that the concept of addition also necessarily includes subtraction, given that adders are traditionally utilized to perform both such operations, with subtraction being implemented by inverting one of the inputs to the adder. Therefore, subtraction operations should be considered as types of addition operations for the purposes of this disclosure. It should also be appreciated that an instruction set may include explicit fixed point subtraction instructions in addition to fixed point addition instructions, and that such instructions may be handled in a similar manner to fixed point addition instructions.

In addition, in the hereinafter disclosed embodiments, specific fixed point instructions may be defined within an instruction set for a floating point execution unit so that such instruction will always be handled by a floating point execution unit configured in a manner consistent with the invention. However, in other embodiments the routing of fixed point instructions to a floating point execution unit may be selective. For example, a superscalar issue unit may be configured to normally route fixed point addition instructions to a fixed point execution unit except in certain circumstances, e.g., when the fixed point execution unit is busy (i.e., does not have a currently-available execution slot), when a fixed point execution unit is disabled to conserve power, etc.

Also, in some embodiments, particularly when a floating point execution unit is a vector-based unit, fixed point addition operations may be combined with floating point operations in the same instruction. As such, one or more lanes of a vector floating point unit may be configured for performing fixed point addition operations at the same time that one or more lanes are configured for performing floating point operations.

Other modifications will be apparent from the detailed description below.

Hardware and Software Environment

Figure 1:
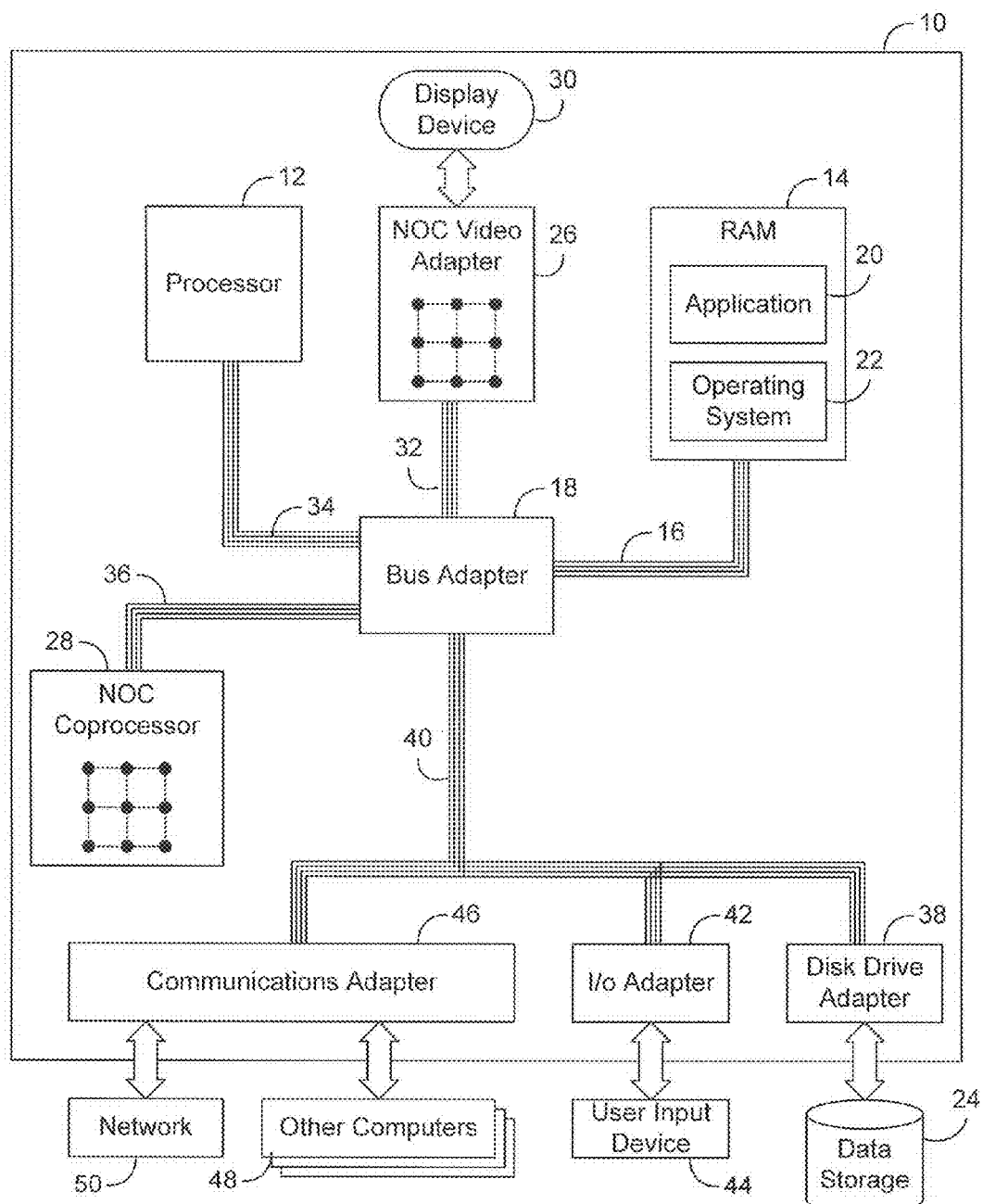
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
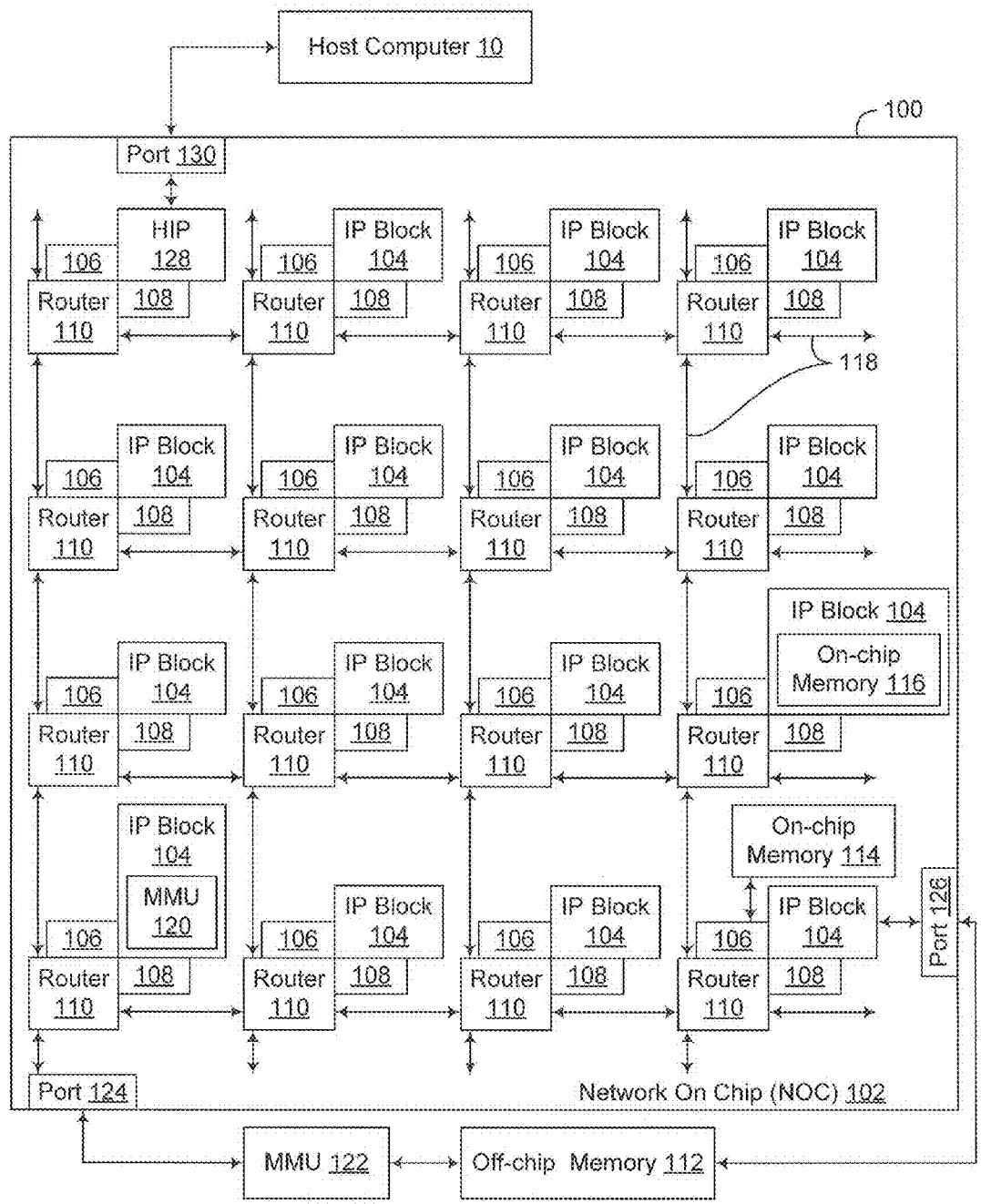
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
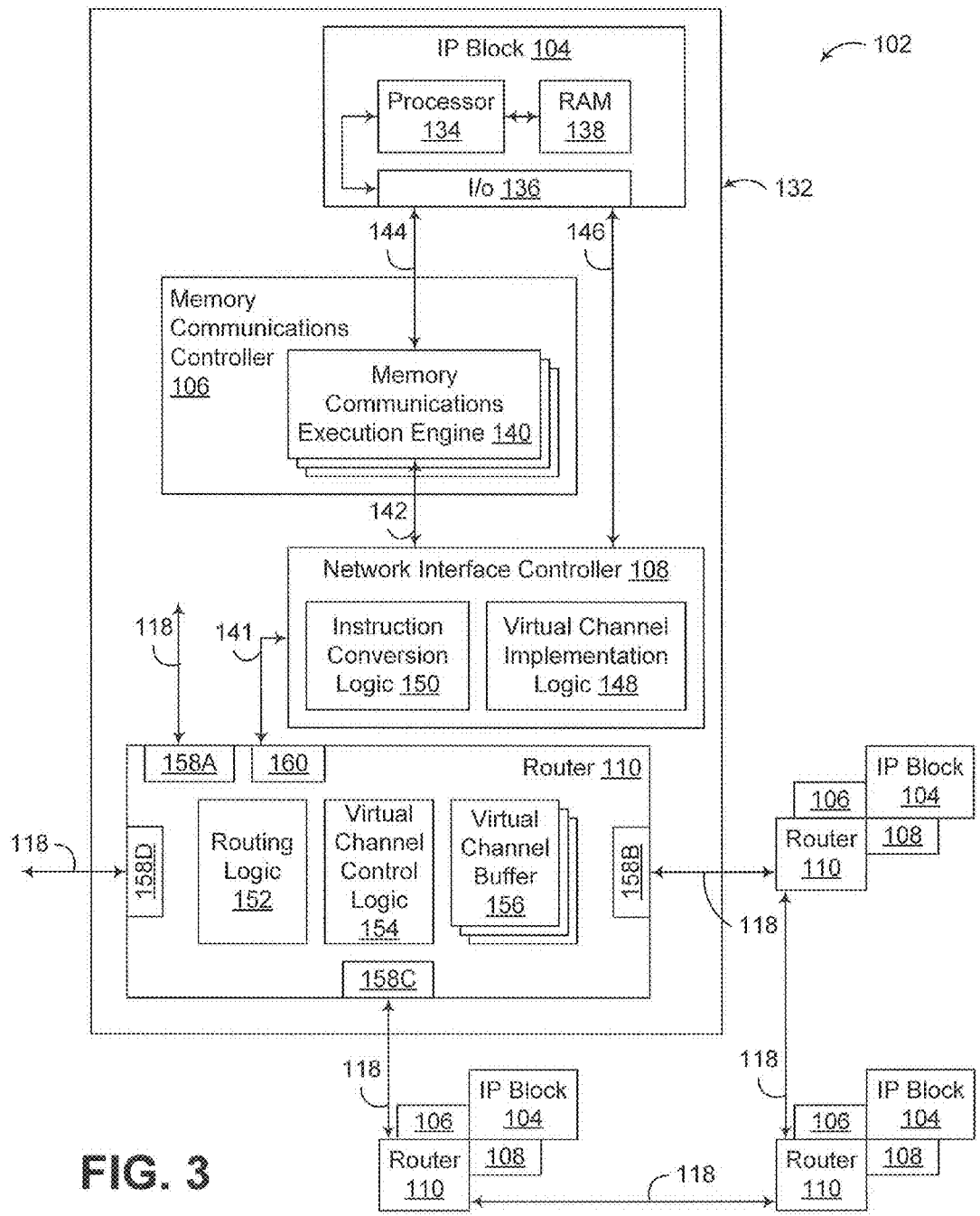
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
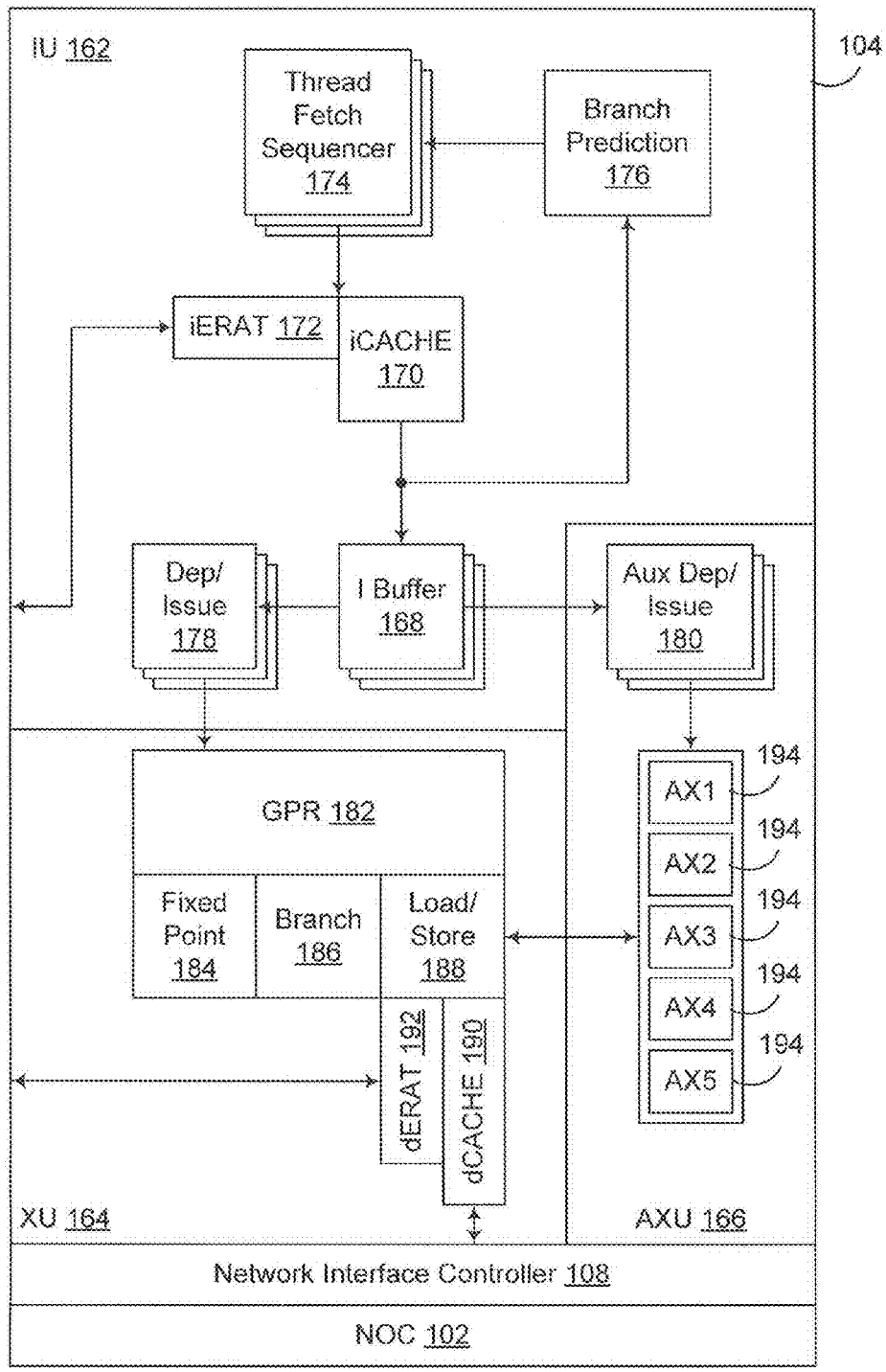
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Floating Point Execution Unit With Fixed Point Functionality

Figure 5:
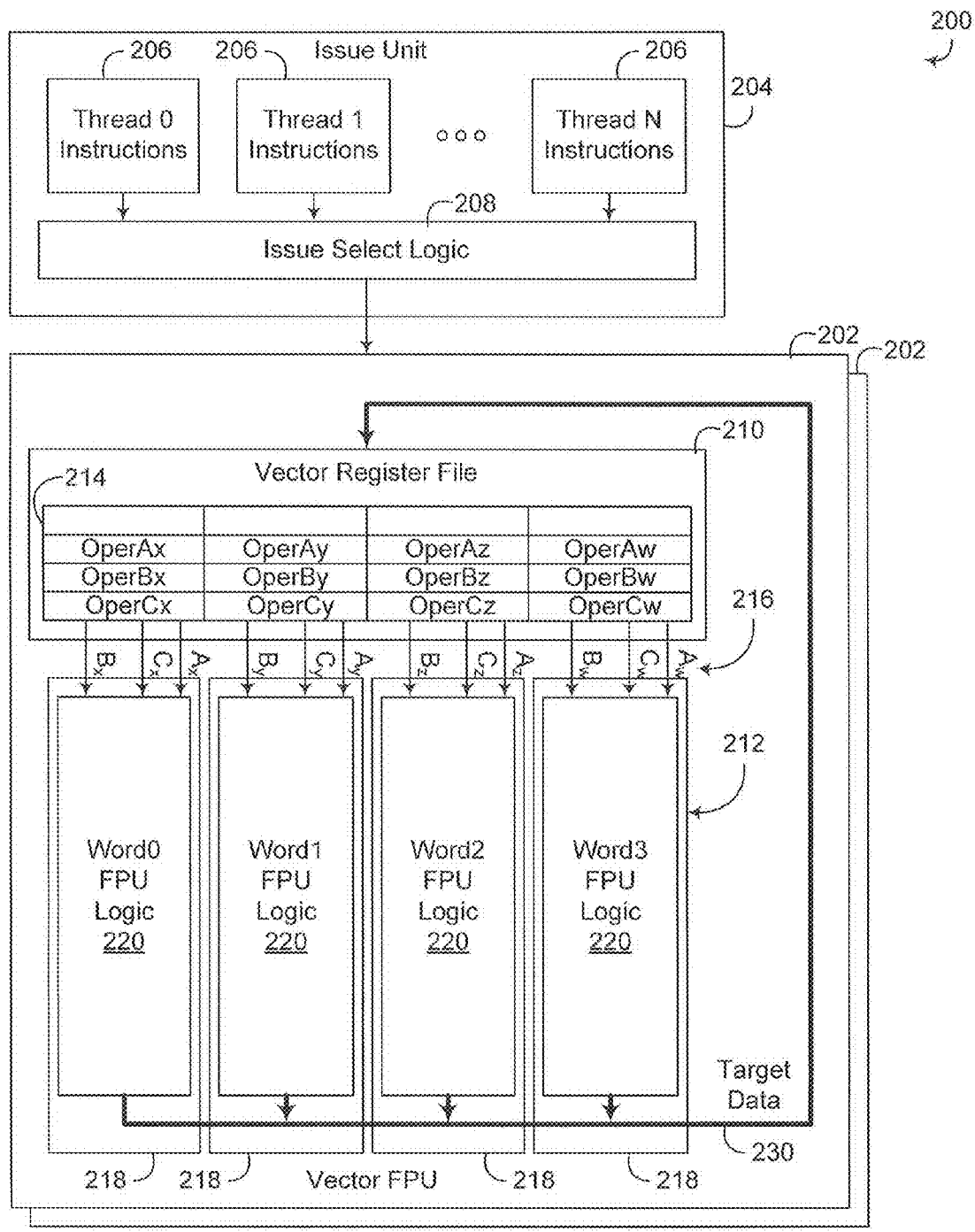
FIG. 5 is a block diagram of a processing unit incorporating a vector floating point execution unit consistent with the invention, and capable of being implemented within an IP block from the NOC of FIG. 2.

Turning now to FIG. 5, this figure illustrates an exemplary processing unit 200 incorporating a floating point execution unit 202 with fixed point functionality consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Floating point execution unit 202 is implemented as a vector floating point execution unit that receives floating point instructions from issue logic 204. Issue logic 204 includes issue select logic 208 that is capable of issuing instructions from a plurality (N) of threads, illustrated at 206. Issue select logic 208 operates to schedule the issuance of instructions by the various threads, and typically includes logic for managing dependencies between instructions, in a manner generally understood in the art. When multiple execution units 202 are supported, issue select logic 208 is also capable of issuing multiple instructions to the multiple execution units each cycle. In some embodiments, however, only one execution unit may be supported, and furthermore, in some embodiments multi-threaded issue of instructions may not be supported.

Floating point execution unit 202 processes instructions issued to the execution unit by issue unit 204, and includes a register file 210 coupled to a multi-stage execution pipeline 212 capable of processing data stored in register file 210 based upon the instructions issued by issue logic 202, and storing target data back to the register file. Floating point execution unit 202 may be implemented as a number of different types of execution units, e.g., a generic floating point unit, or a specialized execution unit such as a graphics processing unit, encryption/decryption unit, coprocessor, XML processing unit, etc., and may be implemented either as a vector or scalar-based unit. In addition, a floating point execution unit 202 consistent with the invention may include only a single processing lane in some embodiments.

In the implementation illustrated in FIG. 5, for example, multi-stage execution pipeline 212 is implemented as a vector floating point unit, e.g., as might be used for image processing, which processes single instruction multiple data (SIMD) instructions issued to the execution unit by issue logic 204. Register file 210 includes a plurality (e.g., 128) of vector registers 214, each including a plurality (e.g., four) words. A plurality of register file inputs and outputs (not shown) are provided to write floating point values into selected registers and output the contents of selected registers to the pipeline 212 for processing. A plurality of operand inputs 216 are provided between register file 210 and multi-stage execution pipeline 212 to provide floating point vectors to the pipeline for processing. Pipeline 212 includes a plurality (e.g., four) processing lanes or sub-units 218 capable of processing vectors stored in register file 210 based upon the instructions issued by issue logic 204, and storing target data back to a vector register in register file 210.

Given the configuration of execution unit 202 as a floating point unit usable in image processing applications, each processing lane 218 is configured to process floating point instructions. While a wide variety of other floating point architectures may be used in the alternative, execution unit 202 includes a pipelined floating point execution architecture capable of operating on three vector operands, denoted A, B and C. For vector operations, four 32-bit word vectors are supported, with the words in each vector being denoted as X, Y, Z and W, and as such, each processing lane 218 receives three operand words, one from each vector. Thus, for example, for the processing lane 218 that processes the X word from each vector, the operands fed to that processing lane are denoted as $A_X$, $B_X$ and $C_X$.

Each processing lane 218 includes floating point logic 220 configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently. Each processing lane 218 is also pipelined to further improve performance. Accordingly, each processing lane 218 includes a plurality of pipeline stages for performing one or more operations on the operands.

For example, turning to FIG. 6, which illustrates floating point logic 220 for one of the processing lanes, a processing lane may include an exponent path 238 used to calculate an exponent portion of a floating point result value, and a significand path, disposed in a fractional logic block 240, used to calculate a significand portion of a floating point result value. A multiplier 242 is used for multiplying the A and C operands, and an aligner 244 aligns operand B with the product computed by multiplier 242, in parallel with the computation of the product. A multiplexer 262 is provided at one of the inputs of multiplier 242 to select either the fractional part of the C operand (CxFrac), when performing a multiply, or the value of "1" whenever it is desired to simply perform an addition operation between operands A and B.

An adder 246, referred to herein as a fraction, mantissa or significand adder, is then used for adding two or more operands. In one embodiment, adder 246 is configured to receive the product computed by multiplier 242 (output as a sum and carry), and add the product to the aligned operand output by aligner 244, thereby performing a multiply-add instruction. One skilled in the art will recognize that multiply-add instructions are frequently performed in vector operations. Therefore, by performing several multiply add instructions in parallel lanes, the efficiency of vector processing may be significantly improved.

A normalizer 248 and a rounder 250 may also be included in logic 240. Normalizer 226 may be configured to represent a computed value in a convenient exponential format. For example, normalizer 226 may receive the value 0.0000063 as a result of an operation and convert the value into a more suitable exponential format, for example, $6.3 \times 10^{-6}$. Rounder 250 is capable of rounding a computed value to a desired number of decimal points. For example, a computed value of 10.5682349 may be rounded to 10.568 if only three decimal places are desired in the result. In one embodiment of the invention rounder 250 may round the least significant bits of the particular precision floating point number the rounder is designed to work with.

For exponent path 238, a series of adders 252, 254 and 256 are primarily used to compute the exponent portion of a floating point result value. Adder 252 is typically referred to as a multiply exponent adder that is used to add the exponents of the operands being multiplied, i.e., operands A and C. For floating point operations, adder 252 adds together the A and C exponents (labeled in FIG. 6 as A×Exp and C×Exp) along with either a value of "0" or "−2Bias" selected by a multiplexer 258. The output of adder 252, denoted as AC×Exp, is then fed to adder 254, which is typically referred to as a B operand exponent unbiasing adder, and which adds to the output of adder 252 the exponent of operand B (B×Exp) and either a value of "0" or "−Bias" selected by a multiplexer 260. This output is then fed to adder 256, which is typically referred to as a result exponent rebiasing adder, which adds a positive bias ("+Bias") to the output of adder 254 prior to writing the result back to the register file.

One skilled in the art will recognize that embodiments of the invention are not limited to the particular pipeline stages, components, and arrangement of components described above and in FIGS. 5-6. For example, in some embodiments, aligner 244 may be configured to align operand B, a product computed by multiplier 242, or both. Furthermore, embodiments of the invention are not limited to the particular components described in FIGS. 5-6. Any combination of the illustrated components and additional components such as, but not limited to, leading zero anticipators, dividers, etc. may be included in each processing lane 218 consistent with the invention.

In the illustrated embodiment, in order to support fixed point functionality in floating point unit 200, a series of multiplexers 264-280 are added to the floating point logic illustrated in FIG. 6 to effectively repurpose one or more of the adders 246, 252, 254 and 256 for use in connection with fixed point addition operations. To facilitate a better understanding of the invention, multiplexers and lines incorporated into logic 220 to support fixed point addition operations are illustrated in bold in FIG. 6.

In addition, the bits in any floating point register used to perform fixed point additions are repurposed to store fixed point values. FIG. 7A, for example, illustrates a typical 32-bit floating point register format in which a floating point value is represented by a one bit sign field (e.g., for the A operand, A×Sgn), a 7 bit exponent field (e.g., for the A operand, A×Exp) and a 24 bit fraction/significand field (e.g., for the A operand, A×Frac). To repurpose a register to store fixed point values, as illustrated in FIG. 7B, a 32-bit floating point register may include four 8 bit fields (e.g., A×0, A×1, A×2 and A×3) representing the four 8-bit words of a 32 bit fixed point value.

Returning to FIG. 6, in the illustrated embodiment, all four adders 246, 252, 254 and 256 are repurposed to perform a 32 bit fixed point addition of 32 bit fixed point values stored in operands A and B, with each adder performing an 8 bit fixed point addition. To add the first words of two fixed point values (e.g., words A×0 and B×0 of operands A and B), multiplexer 264 selects between word A×0 and the positive bias (+Bias) used in floating point operations, while multiplexer 266 selects between word B×0 and the output of adder 254. Thus, when in a fixed point addition mode, multiplexers 264, 266 cause adder 256 to add together A×0 and B×0 instead of adding +Bias to the output of adder 254, as is performed when adder 256 is used for floating point operations.

To add the second words A×1 and B×1, multiplexer 268 selects between word A×1 and the output of adder 252, while multiplexer 270 selects between word B×1 and B×Exp used in floating point operations, and multiplexer 260 selects between 0 and −Bias. Thus, when in a fixed point addition mode, multiplexers 268, 270 cause adder 254 to add together A×1 and B×1 instead of adding the exponent of the B operand (B×Exp) to the output of adder 252, as is performed when adder 254 is used for floating point operations. In addition, when in fixed point addition mode, multiplexer 260 typically also selects a 0 input so that the result is the sum of A×1 and B×1. To add the third words A×2 and B×2, multiplexer 272 selects between word A×2 and the exponent of the C operand (C×Exp), while multiplexer 274 selects between word B×2 and the exponent of the A operand (A×Exp). Thus, when in a fixed point addition mode, multiplexers 272, 274 cause adder 252 to add together A×2 and B×2 instead of adding the exponents of the A and C operands (A×Exp and C×Exp), as is performed when adder 252 is used for floating point operations. In addition, when in fixed point addition mode, multiplexer 258 typically also selects a 0 input so that the result is the sum of A×2 and B×2.

To add the fourth words A×3 and B×3, multiplexer 276 selects between word A×3 and the significand of the A operand (A×Frac), while multiplexer 278 selects between word B×3 and the significand of the B operand (B×Frac). Thus, when in a fixed point addition mode, multiplexers 276, 278 cause adder 246 to add together A×3 and B×3 instead of adding the significand of operand B (B×Frac) to the product of the A and C operands (A×Frac and C×Frac), as is performed when adder 246 is used for floating point operations. In addition, when in fixed point addition mode, multiplexer 262 typically also selects a 1 input so that the output of multiplier 242 is word A×3 and the output of adder 246 is the sum of A×3 and B×3.

In addition, a multiplexer 280 is added to the result write back path to select between either the fixed point result value (A×0+B×0|A×1+B×1|A×2+B×2|A×3+B×3), formed by the outputs of adders 256, 254, 252 and 246, and the floating point result value exponent and significand fields, formed by the outputs of adder 256 and rounder 250.

In the illustrated embodiment, a fixed point addition instruction may be defined in the instruction set for a floating point execution unit, with instruction decode used to configure the floating point execution unit in the appropriate fixed point/floating point mode. In other embodiments, however, a fixed point addition instruction may be indifferent as to whether it is executed by a fixed point execution unit or a floating point execution unit, with an issue unit (e.g., issue unit 162 of FIG. 4) used to route such instructions to either a fixed point execution unit (e.g., fixed point unit 184 of FIG. 4) or a floating point execution unit (e.g., AXU 166 of FIG. 4).

For example, it may be desirable to normally route fixed point addition instructions to a fixed point execution unit except when the fixed point execution unit is busy (e.g., if no execution slot is open for the unit during a given issue cycle), and in such cases route an instruction to the floating point execution unit. FIG. 8, for example, illustrates a fixed point addition instruction routing routine 300 that may be implemented in a superscalar implementation of a processing unit to provide for selective routing of fixed point addition instructions. Routine 300, in response to receiving a fixed point addition instruction in block 302, determines whether an execution slot is available in the fixed point execution unit in block 304, and if so, routes the instruction to that unit by passing control to block 306. Otherwise, if no execution slot is currently available, block 304 passes control to block 308 to route the instruction alternatively to the floating point execution unit.

Selective routing may also be warranted in other instances. For example, if a fixed point execution unit is unavailable for another reason, e.g., after being shut down to conserve power, instructions may be routed to the floating point execution unit. In addition, routing may be based upon data locality, e.g., so that if a fixed point addition operation is being performed on data that is already stored in the register file of a fixed point or floating point execution unit, the instruction will be routed to the appropriate unit.

The embodiments described herein therefore allow for fixed point operations such as additions to be supported in a floating point execution unit. Various modifications may be made to the illustrated embodiments without departing from the spirit and scope of the invention. For example, the invention may be implemented in scalar or vector floating point units. In addition, in vector floating point units, different lanes may be used to perform different operations, e.g., so that one or more floating point operations may be performed concurrently with performing one or more fixed point addition operations in response to the same instruction. Fixed point addition functionality may be supported in all lanes of a floating point execution unit, or only a subset, and even within a given lane, fixed point addition operations may be vectorized (e.g., to perform four 8 bit additions). In addition, for any given adder, only a subset of the bits used in connection with floating point operations may be used for fixed point addition (e.g., to perform an 8 bit addition with a 16 bit adder).

Other modifications will be apparent to one of ordinary skill having the benefit of the instant disclosure. Therefore, the invention lies in the claims hereinafter appended.

What is claimed is:

1. An apparatus comprising a circuit, the circuit comprising:
a vector register file including a plurality of vector floating point registers; and
a vector floating point execution unit coupled to the vector register file and configured to perform a floating point operation on first, second and third floating point operands respectively stored in first, second and third vector floating point registers in the vector register file during execution of a first, floating point instruction, the vector floating point execution unit including a first lane including an exponent path and a significand path respectively configured to generate exponent and significand fields of a floating point value calculated during execution of the first instruction, the exponent path including first, second and third adders, wherein the first adder is a multiply exponent adder, the second adder is a B operand exponent unbiasing adder and the third adder is a result exponent rebiasing adder, and wherein the significand path including a fourth, fraction adder;
wherein the floating point execution unit is further configured to process first and second fixed point operands respectively stored in fourth and fifth vector floating point registers in the vector register file during execution of a second, fixed point instruction by using the first, second, third and fourth adders to generate first, second, third and fourth words of a fixed point value calculated during execution of the second instruction by adding together respective first, second, third and fourth words of the first and second fixed point operands.

2. An apparatus comprising a circuit, the circuit comprising:
a floating point execution unit configured to process at least one floating point operand during execution of a first instruction, the floating point execution unit including an exponent path and a significand path respectively configured to generate exponent and significand fields of a floating point value calculated during execution of the first instruction, the exponent path including first and second adders used when generating the exponent field of the floating point value;
wherein the floating point execution unit is further configured to process at least one fixed point operand during execution of a second instruction by using each of the first and second adders in the exponent path to generate at least a portion of a at least one fixed point value calculated during execution of the second instruction, wherein each of the first and second adders is configured to add at least portions of first and second fixed point operands identified by the second instruction when generating the at least a portion of the at least one fixed point value calculated during execution of the second instruction.

3. The apparatus of claim 2, the circuit further comprising a register file including a plurality of floating point registers, the register file including an output coupled to an operand input of the floating point execution unit, and an input coupled to receive a result output of the floating point execution unit.

4. The apparatus of claim 3, wherein the second instruction identifies a first floating point register from the register file in which is stored a first fixed point operand, wherein the first adder in the exponent path is configured to add at least a portion of the first fixed point operand during execution of the second instruction.

5. The apparatus of claim 2, wherein the at least one fixed point value includes a first fixed point value, wherein the first adder is configured to generate a first word of the first fixed point value during execution of the second instruction, and wherein the second adder is configured to generate a second word of the first fixed point value during execution of the second instruction.

6. The apparatus of claim 5, wherein the exponent path includes a third adder used when generating the exponent field of the floating point value during execution of the first instruction, wherein the third adder is further configured to generate a third word of the first fixed point value during execution of the second instruction.

7. The apparatus of claim 6, wherein the significand path includes a fourth adder used when generating the significand path of the floating point value during execution of the first instruction, wherein the fourth adder is further configured to generate a fourth word of the first fixed point value during execution of the second instruction.

8. The apparatus of claim 7, wherein each of the floating point value and the first fixed point value is 32 bits in length, and wherein each of the first, second, third and fourth words is 8 bits in length.

9. The apparatus of claim 2, wherein each of the first and second adders is selected from the group consisting of a multiply exponent adder, a B operand exponent unbiasing adder and a result exponent rebiasing adder.

10. The apparatus of claim 2, wherein the at least one fixed point value includes a first fixed point value and a second fixed point value, wherein the second instruction is a vector instruction, and wherein the second adder is configured to generate the second fixed point value during execution of the second instruction.

11. The apparatus of claim 2, wherein the floating point execution unit comprises a vector floating point execution unit including at least first and second lanes, wherein the exponent and significand paths are disposed in the first lane.

12. The apparatus of claim 11, wherein the floating point execution unit is configured to perform a fixed point operation in the first lane concurrently with performing a floating point operation in the second lane.

13. The apparatus of claim 2, wherein the floating point execution unit is disposed in a processing unit, and wherein the processing unit does not include a fixed point execution unit separate from the floating point execution unit.

14. The apparatus of claim 2, wherein the floating point execution unit is disposed in a super scalar processing unit including a fixed point execution unit, and wherein the processing unit is configured to execute the second instruction in the floating point execution unit in response to determining that the fixed point execution unit is busy.

15. An integrated circuit device including the circuit of claim 2.

16. A method of executing instructions in a floating point execution unit, the method comprising:
    executing a first instruction in the floating point execution unit to calculate a floating point value from at least one floating point operand identified by the first instruction, wherein the floating point execution unit includes an exponent path and a significand path respectively configured to generate exponent and significand fields of the floating point value, and wherein the exponent path includes first and second adders used when generating the exponent field of the floating point value; and
    executing a second instruction in the floating point execution unit to calculate at least one fixed point value from at least one fixed point operand identified by the second instruction, wherein executing the second instruction includes using each of the first and second adders in the exponent path to generate at least a portion of the at least one fixed point value, wherein each of the first and second adders is configured to add at least portions of first and second fixed point operands identified by the second instruction when generating the at least a portion of the at least one fixed point value calculated during execution of the second instruction.

17. The method of claim 16, wherein the at least one fixed point value includes a first fixed point value, wherein the first adder is configured to generate a first word of the first fixed point value during execution of the second instruction, and wherein the second adder is configured to generate a second word of the first fixed point value during execution of the second instruction.

18. The method of claim 17, wherein the exponent path includes a third adder used when generating the exponent field of the floating point value during execution of the first instruction, wherein the third adder is further configured to generate a third word of the first fixed point value during execution of the second instruction.

19. The method of claim 18, wherein the significand path includes a fourth adder used when generating the significand path of the floating point value during execution of the first instruction, wherein the fourth adder is further configured to generate a fourth word of the first fixed point value during execution of the second instruction.

20. The method of claim 16, wherein the at least one fixed point value includes a first fixed point value and a second fixed point value wherein the second instruction is a vector instruction, and wherein the second adder is further configured to generate the second fixed point value during execution of the second instruction.

21. The method of claim 16, wherein the floating point execution unit comprises a vector floating point execution unit including at least first and second lanes, wherein the exponent and significand paths are disposed in the first lane, and wherein the floating point execution unit is configured to perform a fixed point operation in the first lane concurrently with performing a floating point operation in the second lane.

22. The method of claim 16, wherein the floating point execution unit is disposed in a super scalar processing unit including a fixed point execution unit, the method further comprising:
    determining that the fixed point execution unit is busy; and
    routing the second instruction to the floating point execution unit in response to determining that the fixed point execution unit is busy.

* * * * *